Dec. 24, 1968  L. C. WASSON  3,417,768

RELIEF VALVE MECHANISM

Filed Dec. 5, 1966

Inventor
Loerwood C. Wasson
By Merl E. Sceales
Attorney

United States Patent Office 3,417,768
Patented Dec. 24, 1968

3,417,768
RELIEF VALVE MECHANISM
Loerwood C. Wasson, Wauwatosa, Wis., assignor to A. O. Smith Corporation, Milwaukee, Wis., a corporation of New York
Filed Dec. 5, 1966, Ser. No. 599,311
10 Claims. (Cl. 137—73)

This invention relates to a relief valve mechanism and more particularly to a combination pressure relief and temperature relief valve for use in a domestic water heater.

The valve mechanism of the invention is to be incorporated with a water heating system, such as a domestic water heater, and acts to provide a pressure relief if excessive pressures are developed in the water tank and also provides a temperature relief in the event of overheating of the water.

Combination pressure relief and temperature relief valves have been used in water systems in the past. In a common valve mechanism of this type the temperature relief is achieved by a fusible metallic element which encloses a passage in the valve fitting. When the water is heated to a temperature above the melting point of the fusible element, the element melts to thereby open the passage and release the water from the system.

The pressure relief for the conventional combination valve mechanism is normally achieved by means of a spring loaded valve which closes off a relief passage in the valve body. A resilient member, such as a coil spring, urges the valve to a closed position and when the internal pressure of the water system overcomes the force of the spring, the valve will open to relieve the pressure. With valves of this type, the sealing effect of the valve decreases as the internal pressure of the water system increases. Thus, as the internal pressure approaches the force of the spring, the sealing force being applied to the valve is relatively small, with the result that the valve may leak.

The present invention is directed to an improved valve mechanism to be incorporated with a water system which not only provides temperature relief for excessive temperatures, but also provides a fast snap-acting pressure relief to relieve excessive pressures. The valve mechanism is particularly adapted to be connected to the drain opening in a domestic water heater and can be installed with either existing or new water heaters without alteration of other fittings or drilling of additional holes in the tank wall.

The valve mechanism of the invention includes a fitting which is connected to the wall of the water heater tank and a thin, snap-acting disc valve is located within the fitting and is biased into sealing engagement with a valve seat by a coil spring. The disc valve is provided with a central opening which is enclosed by a fusible metallic element.

The coil spring is located upstream of the valve disc and urges the periphery of the valve disc into sealing engagment with an O-ring seal. Thus, the internal pressure within the tank acts in conjunction with the force of the spring to increase the sealing effect as the internal pressure increases. When the internal pressure rises to a predetermined value, the valve disc will snap to a reverse position. In this reverse position the central portion of the valve disc will contact a positioning point which limits the movement of the central portion of the disc so that it moves only a limited distance after the snap action occurs. Because the total movement of the valve disc is not completed when the central portion of the valve disc contacts the positioning point, the peripheral edge of the valve disc will move against the force of the coil spring and the pressure of the water to break the valve engagement and open the passage through the fitting to relieve the pressure.

To provide the temperature relief, the fusible element is designed to melt at a temperature in excess of normal temperature encountered within the water heater tank. When this excessive temperature is reached, the element will melt to thereby open the passage in the fitting and drain the water in the tank.

The present invention provides an improved valve mechanism which incorporates both a pressure relief valve and a temperature relief valve. The pressure relief valve is a snap-acting type which functions to increase the sealing effect as the internal pressure in the water system increases. This increased sealing effect is achieved up to the pressure required to snap the valve to the open positionand when this pressure is reached, the valve will immediately snap to its reverse position to open the passage and relieve the pressure.

The fusible element, which acts as a temperature relief mechanism is located in the central portion of the valve disc where it will be continuously exposed to the heated water and yet will not interfere with the snap action of the valve disc.

The valve mechanism of the invention is particularly adaptable for use with a domestic water heater and can be installed in the drain opening in the bottom of the tank. The valve mechanism can be used with either existing or new water heaters without alteration of other tank fittings or drilling additional holes in the tank wall.

Other objects and advantages will appear in the course of the following description.

The drawings illustrate the best mode presently contemplated of carrying out the invention.

Figure 1:
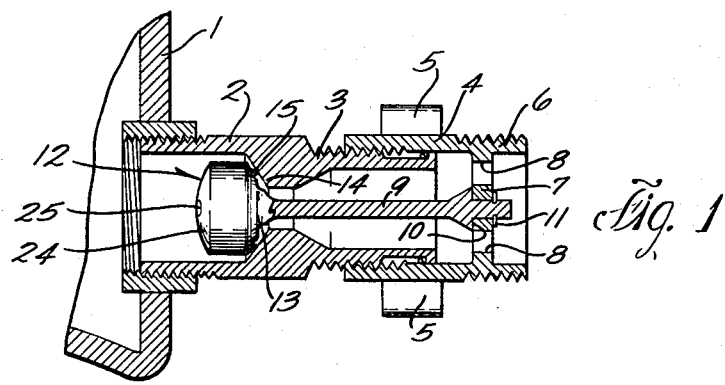
FIG. 1 is a longitudinal section of a drain fitting incorporating the valve mechanism of the invention.

The drawings illustrate a tank or vessel 1 such as a domestic hot water heater adapted to contain heated water or other liquid under pressure. A fitting 2 is threaded within an opening in the tank wall and the outer end 3 of fitting 2 is threaded and receives a coupling 4. The outer surface of coupling 4 is provided with a series of hand lugs 5 which aid in threading the coupling onto the end 3 of fitting 2. The outer end 6 of coupling 4 is threaded and is adapted to receive a hose coupling or other connector.

Figure 4:
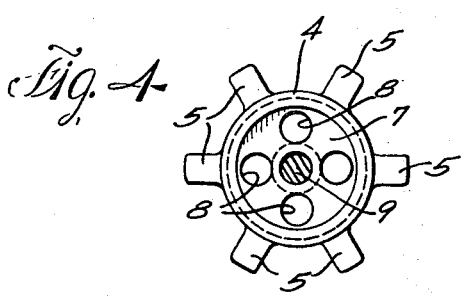
FIG. 4 is an end view of the fitting.

As best shown in FIGS. 1 and 4, a wall 7 is disposed across the coupling 4 and is provided with a series of openings 8. In addition to the openings 8, the wall 7 is provided with a central opening which receives a stem 9. Stem 9 is provided with a shoulder 10 which bears against the wall 7 and the stem is retained within the opening in the wall by a snap ring 11.

A relief valve assembly 12 is carried by the inner end of the stem 9 and the assembly 12 includes a body portion 13 which is sealed against the seat 14 of fitting 2 by an O-ring 15. By threading the coupling 4 with respect to the fitting 2 by use of the hand lugs 5, the valve body 13 is drawn outwardly to provide a tight sealing engagement with the seat 14 of fitting 2.

Figures 2, 3:
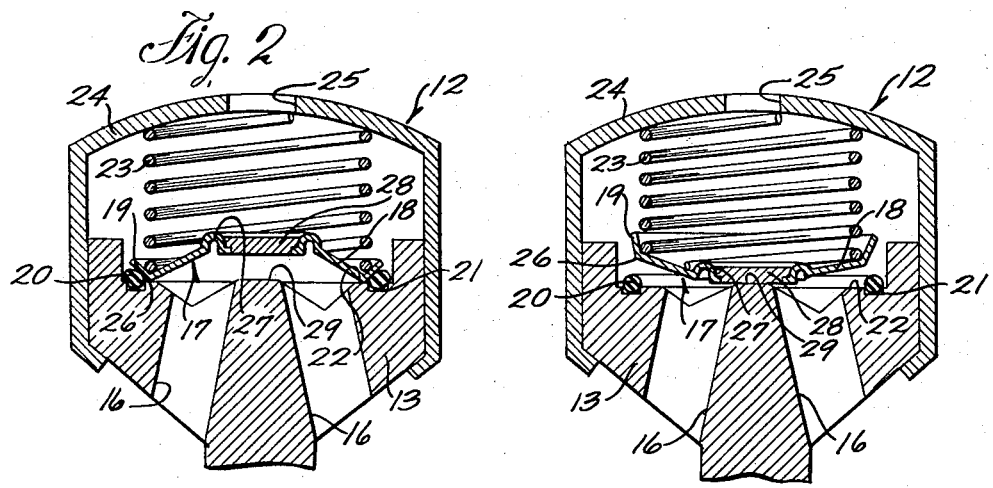
FIG. 2 is an enlarged longitudinal section showing the valve mechanism with the pressure relief valve being in the closed position.
FIG. 3 is a view similar to FIG. 2 showing the pressure relief valve in the open position.

As best shown in FIG. 2, the body 13 is provided with a series of passages 16 and the passages are normally closed off by a snap-acting disc valve 17. The valve 17 is formed of a thin, flexible material, such as metal, and includes an annular body section 18, which is generally convex in shape, in a direction toward the tank 1.

Formed integrally with the body section 18 is an annular flange 19 which extends at an angle with respect to body section 18 and is adapted to bear against an O-ring seal 20 mounted within a recess 21 in the annular wall or valve seat 22 of valve body 13.

To urge the flange 19 into tight sealing engagement with the O-ring 20 a coil spring 23 is interposed between the flange 19 and a spring cage or closure 24 that extends inwardly from the body 13 and is provided with a central opening 25. The cage 24 not only serves as a support for the spring 23, but also minimizes the circulation of water around the valve 17 and spring 23 and thereby reduces scale formation on these elements.

The force of the coil spring 23 acts in conjunction with the internal pressure of tank 1 to wedge the flange 19 against the O-ring 20 to provide a fluid-tight seal between the members as shown in FIG. 2. As the pressure in the tank increases, the annular edge 26 of valve 17 contacts the seat 22 of valve body 13 to prevent further compression of the O-ring seal.

The central portion of the valve 17 is provided with a bent edge 27 which borders a central opening in the valve. A fusible metallic alloy 28 is mounted within the central opening and is sealed to the bent edge 27. The alloy 28 is designed to melt at a predetermined temperature which corresponds to an overheated temperature of the water in tank 1. If the water within the tank is heated to this excessive temperature, the alloy element 28 will melt to open the central passage in valve 17 and thereby permit the overheated water to escape through the fitting 2.

In addition to the temperature relief, the snap disc valve 17 serves as a pressure relief to relieve excessive pressure in the tank 1. The valve 17 is curved or bowed so that it is generally convex in a direction toward the tank 1. The internal pressure of the water within the tank 1 will thereby be applied to the valve 17 which in combination with the force of coil spring 23, forces the edge 26 against the seat 22 of body 13. As the pressure forces the valve 17 outwardly, the flange 19 wedges against the O-ring seal 20 to provide a positive fluid-tight seal. Thus, as the pressure within the tank 1 is increased, the sealing effect o fthe valve 17 against the valve body 13 is also increased until edge 26 of valve 17 contacts seat 22 to limit further sealing pressure. When the internal pressure rises to a predetermined value, the valve 17 will snap to the open position shown in FIG. 3. The snap action is designed to occur when the convex body section 18 is subjected to a given internal pressure and this is determined by the thickness of the valve disc, as well as the shape and the materials used in fabricating the valve disc. The snap action produced by the valve 17 causes valve 17 to become concave toward the tank 1. After the center of the disc has moved to a position where the snap occurs, its further movement is limited by contact of element 28 with surface 29 of valve body 13. Because the total snap movement of the valve disc toward its equilibrium position is not completed at this point, the peripheral flange 19 of the valve disc 17 will move against the pressure of the water and the force of the coil spring 23 to break the engagement of flange 19 with the O-ring 20 to open passages 16 and discharge the water through the fitting to relieve the pressure.

The pressure relief valve differs from the normal pressure relief valve in that the internal pressure acts to open the conventional pressure relief valve against the sealing force of a resilient member such as a spring. As the internal pressure approaches the spring force, there is very little sealing effect and leakage can occur through the valve. In contrast to this, the internal pressure of tank 1 mantains a maximum sealing effect of the valve 17 until the predetermined pressure is reached and the valve will then immediately snap to the open position to permit the water to drain from the tank.

Since the central portion of the disc valve 17 does not function in the snap action, the central portion is provided with an opening which receives the low melting point alloy element 28. The temperature of melting of element 28 can be designed so that the element 28 will withstand normal temperatures in the water heater, but will melt before dangerously high temperatures are encountered. When the alloy element 28 melts, the central opening in the valve 17 is opened to thereby permit the flow of water through the passages 16.

As previously mentioned, the valve mechanism of the invention is particularly adaptable for use with a domestic water heater and can be conveniently installed with the drain opening at the bottom of the tank wall. While the highest temperatures in the water heater tank occur at the top of the tank, the fusible temperature relief element 28 can be located in the drain fitting at the bottom of the tank by designing the melting temperature to compensate for the normal temperature gradient between the top and bottom of the tank.

Various modes of carrying out the invention are contemplated as being within the scope of the following claims particularly pointing out and distinctly claiming the subject matter which is regarded as the invention.

I claim:

1. A relief valve mechanism for use with a vessel containing a liquid under pressure, comprising conduit means having an inlet end communicating with the vessel and having an outlet end, a valve seat disposed in said conduit means between said inlet end and said outlet end, a snap-acting valve member engaged with the valve seat and having a generally convex shape in a direction toward said inlet end, and resilient means for urging the peripheral edge portion of said valve member into engagement with said valve seat to close off said conduit means, internal pressure within said vessel forcing said valve member into tight sealing engagement with the valve seat and said valve member characterized by the ability to snap to a generally concave shape to open said conduit means when subjected to a predetermined internal pressure above pressures normally encountered in said vessel.

2. The relief valve mechanism of claim 1, in which said valve member has a central opening therein, and a fusible metallic element disposed in sealed relation within the opening in said valve member and designed to melt at a predetermined temperature above temperatures normally encountered in said vessel.

3. The relief valve mechanism of claim 1, and including a fixed member located generally centrally of said valve seat and disposed between said outlet end and said valve disc, said fixed member being arranged to be contacted by the central portion of said valve disc after a predetermined amount of snap movement of said valve disc to restrict further snap movement and effect movement of the peripheral edge portion of said valve disc against the force of said resilient member to open said conduit means.

4. The relief valve mechanism of claim 1, and including an annular resilient seal disposed in a recess in said valve seat and facing said inlet end of the conduit means, said seal disposed to be engaged by the peripheral edge portion of said valve member to provide a fluid-tight seal between the valve seat and the valve member.

5. The relief valve mechanism of claim 1, and including a closure member extending across said conduit means and located between said valve seat and said inlet end, said closure member having an opening therein substantially smaller in cross section than the internal dimension of said conduit means to thereby restrict the flow of liquid around said valve member.

6. The relief valve mechanism of claim 5, in which said resilient means comprises a coil spring with one end of said coil spring disposed in engagement with the peripheral edge portion of the valve member and the opposite end of said coil spring being disposed in engagement with said closure member.

7. The relief valve mechanism of claim 6, in which the opening in said closure member is disposed in axial alignment with said coil spring.

8. The relief valve mechanism of claim 1, in which said valve member has a body section extending at an acute angle to the axis of said valve member and said valve member includes a peripheral flange extending at an angle to said body section, and said valve mechanism also including an annular sealing member disposed on said valve seat and located to be engaged by said flange to provide a seal between said valve member and said valve seat.

9. A relief valve mechanism for use with a vessel containing a liquid under pressure, comprising a fitting connected to the vessel and having an inlet end communicating with the vessel and having an outlet end, a first valve seat disposed within said fitting, a valve body disposed in sealing engagement with said first valve seat, said valve body having a passage extending therethrough and having a second valve seat bordering said passage and facing toward said inlet end of the fitting, a snap-acting valve member engaged with the second valve seat and having a generally convex shape in a direction toward said inlet end, said valve member having an opening therein, a support member located in said fitting between said second valve seat and said inlet end, resilient means interposed between the peripheral edge portion of said valve member and said support member for urging said valve member into engagement with said second valve seat to close off said passage, and a fusible metallic element disposed in sealed relation within the opening in said valve member and designed to melt at a predetermined temperature above temperatures normally encountered in said vessel, internal pressure within said vessel forcing said valve member into tight sealing engagement with the valve seat and said valve member characterized by the ability to snap to a generally concave shape to open said passage when subjected to a predetermined internal pressure above pressures normally encountered in said vessel.

10. A relief valve mechanism for use with a vessel containing a liquid under pressure, comprising conduit means having an inlet end communicating with the vessel and having an outlet end, a valve seat disposed in said conduit means between said inlet end and said outlet end, a snap-acting valve member engaged with the valve seat and having a generally convex shape in a direction toward said inlet end, support means located in said conduit means between said valve seat and said inlet end, and resilient means connected to said support means and disposed in engagement with the peripheral edge portion of said valve member for urging said peripheral portion into engagement with said valve seat, internal pressure within said vessel acting in conjunction with said resilient means to force said valve member into tight sealing engagement with the valve seat, said valve member constructed to snap to a generally concave shape to open said conduit means when said valve member is subjected to a predetermined internal pressure, the force of the snap action of said valve member being greater than the combined force of the resilient means and said internal pressure.

References Cited

UNITED STATES PATENTS

| | | | |
|---|---|---|---|
| 1,864,380 | 6/1932 | Te Pas | 137—73 |
| 2,271,786 | 2/1942 | Watkins | 137—73 |
| 2,585,863 | 2/1952 | Smith | 137—469 X |
| 2,589,072 | 3/1952 | Garretson | 137—73 |
| 2,615,675 | 10/1952 | Mellert | 137—525 X |
| 2,704,548 | 3/1955 | Ralston | 137—469 |
| 2,966,164 | 12/1960 | Britton | 137—73 |
| 3,036,592 | 5/1962 | Lips | 137—467 |
| 3,164,164 | 1/1965 | Pall et al. | 137—525 X |

STANLEY N. GILREATH, *Primary Examiner.*

U.S. Cl. X.R.

137—468, 469, 525; 236—61, 92; 251—75, 176, 336